(12) United States Patent
Mishima

(10) Patent No.: US 7,773,352 B2
(45) Date of Patent: Aug. 10, 2010

(54) MOTOR DRIVE DEVICE WITH LOCK PROTECTION FUNCTION

(75) Inventor: Tomofumi Mishima, Kyoto (JP)

(73) Assignee: Rohm Co., Ltd. (JP)

( * ) Notice: Subject to any disclaimer, the term of this patent is extended or adjusted under 35 U.S.C. 154(b) by 293 days.

(21) Appl. No.: 12/101,338

(22) Filed: Apr. 11, 2008

(65) Prior Publication Data

US 2008/0315808 A1    Dec. 25, 2008

(30) Foreign Application Priority Data

Apr. 12, 2007    (JP) .............................. 2007-105184

(51) Int. Cl.
*H02P 7/08*    (2006.01)
(52) U.S. Cl. ............................. 361/30; 361/23; 361/28; 361/1; 363/50; 318/432; 318/434; 318/798; 323/274; 323/284
(58) Field of Classification Search .................. 361/31, 361/23, 28; 318/432, 434, 798, 400.21; 363/50; 323/274, 284
See application file for complete search history.

(56) References Cited

U.S. PATENT DOCUMENTS

| | | | | | |
|---|---|---|---|---|---|
| 4,748,386 | A | * | 5/1988 | Nakanishi et al. | ...... 318/400.21 |
| 5,317,244 | A | * | 5/1994 | Ishikura | ................. 318/400.21 |
| 5,574,608 | A | * | 11/1996 | Fukuoka | ....................... 361/23 |
| 5,929,576 | A | * | 7/1999 | Yasohara et al. | ....... 318/400.22 |
| 6,611,117 | B1 | * | 8/2003 | Hardt | ..................... 318/400.22 |
| 2004/0169968 | A1 | * | 9/2004 | Mohr et al. | .................... 361/33 |
| 2006/0208675 | A1 | * | 9/2006 | Alberkrack et al. | ......... 318/254 |

FOREIGN PATENT DOCUMENTS

| | | |
|---|---|---|
| JP | 8-140393 A | 5/1996 |
| JP | 10-234130 | 9/1998 |
| JP | 11-308872 A | 11/1999 |
| JP | 2000-69791 A | 3/2000 |
| JP | 2001-78484 A | 3/2001 |
| JP | 2002-247880 A | 8/2002 |
| JP | 2005-6405 | 1/2005 |

OTHER PUBLICATIONS

Office Action for JP2007-105184 mailed Nov. 4, 2009 with English translation.

* cited by examiner

*Primary Examiner*—Rita Leykin
(74) *Attorney, Agent, or Firm*—Cantor Colburn LLP

(57) ABSTRACT

A cooling system is provided with a motor drive device, a fan motor, and a Hall element. The motor drive device includes a lock protection circuit and a lock controller. When a control signal instructing rotation of the fan motor that is to be driven instructs stoppage of the motor for a predetermined time-period or longer, the lock controller has the lock protection circuit inactive. At an occasion when the control signal has continued to instruct stoppage of the fan motor for a first time-period or longer, a standby controller starts time measurement, and after a further predetermined second time-period has elapsed, makes at least a part of the motor drive device transition to a standby mode.

21 Claims, 3 Drawing Sheets

MOTOR DRIVE DEVICE WITH LOCK PROTECTION FUNCTION

BACKGROUND OF THE INVENTION

1. Field of the Invention

The present invention relates to motor drive technology, and in particular, to a motor drive device provided with a lock protection function, a cooling system using the motor drive device, and a lock protection method.

2. Description of the Related Art

With the speeding up of personal computers and workstations in recent years, operation speeds are increasing steadily for computational LSIs (Large Scale Integrated circuits), such as in CPUs (Central Processor Units), DSPs (Digital Signal Processors) and the like.

In such LSIs, as the operational speed, that is, clock frequency, increases, amounts of generated heat become large. There is a problem in that heat generated from an LSI leads to thermorunaway of the LSI itself, or has an effect on a surrounding circuit. Therefore, appropriate thermal cooling of the LSI is an extremely important technology.

An example of a technology for cooling the LSI is a cooling method of air-cooling by a cooling fan. In this method, for example, the cooling fan is installed opposite a front surface of the LSI, and cool air is blown on the LSI front surface by the cooling fan.

In a motor that drives the cooling fan, when the motor is locked by a foreign object being caught in the fan or the like, there is a risk of damaging device reliability by an excess current flowing in a coil or a semiconductor device. To tackle this type of problem, a lock protection circuit is used which stops energization of a motor coil when rotation of the motor is stopped.

In the technology described in Patent Document 1, when it is detected that rotation of a motor is stopped based on output of a rotation sensor that detects a rotation state of the motor, an automatic reset signal E is generated until the motor is reset to a rotation state. The automatic reset signal E is, for example, a signal that sequentially repeats an ON state of approximately 0.5 seconds and an OFF state of approximately 3 seconds. That is, when it is detected that rotation of the motor is stopped, after a halt period of approximately 3 seconds an attempt to start the motor for 0.5 seconds is repeated.

However, in the technology described in Patent Document 1, a lock protection function operates not only in cases in which the motor is locked, but also when rotation of the motor is stopped by an instruction by a control signal. As a result, when a signal that makes the motor rotate, from outside, is inputted, after operation of the lock protection function, after this input, until the automatic reset signal E is asserted, the motor cannot be rotated. That is, after the motor has been stopped by an instruction by the control signal, when a temperature rise of a device to be cooled is detected and the motor restarts rotation, a time lag until the start of rotation occurs, and there is a problem with temperature management.

Patent Document 1: Japanese Patent Application, Laid Open No. 2005-6405
Patent Document 2: Japanese Patent Application, Laid Open No. H10-234130

SUMMARY OF THE INVENTION

Recognizing this situation, the inventor realized the present invention, and a general purpose thereof is the provision of a motor drive device that can promptly restart rotation of a motor, after the motor has been stopped by an instruction by a control signal, a lock protection method, and a cooling system that makes use thereof.

An embodiment of the invention relates to a motor drive device. The motor drive device includes: a drive unit which controls energization of a motor that is to be driven, based on a control signal instructing rotation of the motor; a lock protection circuit which stops energization of the motor, when the motor is stopped; a lock controller which has the lock protection circuit inactive, in cases in which the control signal continues to instruct stoppage of the motor for at least a predetermined first time-period; and a standby controller which starts time measurement at an occasion when the control signal has continued to instruct stoppage of the motor for at least the first time-period, and after a further predetermined second time-period has elapsed, stops at least part of the motor drive device, and makes the motor drive device transit to a standby mode.

According to this embodiment, in cases in which the control signal continues to instruct stoppage of the motor for at least the first time-period, the lock controller has the lock protection circuit inactive, so that it is possible to speed up restarting driving once again, after rotation of the motor is stopped by the instruction by the control signal. The control signal may be a pulse width modulation signal. The control signal may be a signal which adjusts duty ratio of this pulse width modulation signal.

Furthermore, after the second time-period has elapsed, since there is a transition to the standby mode, it is possible to realize low power consumption, and when there is a transition to the standby mode, since the lock protection circuit is inactive, when the motor is instructed to drive thereafter, rotation of the motor can be done speedily.

The standby controller, in the standby mode, may stop a voltage source (starting circuit) which generates a reference voltage for the motor drive device.

The standby controller, in the standby mode, may stop supplying of voltage to a Hall element for detecting rotation of the motor. Since current flowing in the Hall element is relatively large in comparison to current in another circuit block, it is possible to effectively reduce power consumption.

The standby controller, in the standby mode, may fix potential of a control terminal of a transistor of an output stage connected to a coil of the motor, to turn the transistor fully OFF.

Since the size of the transistor of the output stage is large, the effect of reducing power consumption by turning it fully OFF is large.

The standby controller, at an occasion when the control signal instructs driving of the motor, may reset from the standby mode to normal mode.

The lock controller may be provided with a counter circuit which measures elapsed time from when the control signal instructs stoppage of the motor. In such cases, it is possible to accurately measure the predetermined first time-period.

With regard to the lock protection circuit, a time-period, that is shorter than a verification time-period necessary for confirming that the motor has stopped, may be set as the predetermined first time-period. In such cases, after the motor has been stopped by an instruction by the control signal, since the lock protection circuit is inactive before the lock protection function operates, in cases in which the motor is driven once again after stoppage of the motor by the control signal, it is possible to promptly restart rotation of the motor.

The motor drive device may be monolithically integrated on one semiconductor substrate. "monolithically integrated" includes cases in which all component elements of the circuit may be formed on the semiconductor substrate, and cases in which main component elements of the circuit are integrated as a unit, and some resistors, capacitors, or the like, for adjusting a circuit constant may be arranged outside the semiconductor substrate. By integrating the motor drive device as one LSI, it is possible to reduce circuit area.

Another embodiment of the present invention is a cooling system. The system is provided with a fan motor and any motor drive device described above, which drives, as a motor to be driven, the fan motor.

According to this embodiment, since the lock controller of the abovementioned motor drive device, in cases in which the control signal continues to instruct stoppage of rotation of the motor for the predetermined first time-period or longer, has the lock protection circuit inactive, after rotation of the motor is stopped by an instruction by the control signal, it is possible to promptly restart rotation of the motor, and to appropriately manage the temperature of a device to be cooled.

An even further embodiment of the present invention is a lock protection method. This method is a lock protection method of stopping energization of a motor to be driven, when rotation of the motor is stopped, and includes: monitoring a control signal which instructs rotation of the motor and measuring a time-period in which the control signal continues to instruct stoppage of rotation of the motor; releasing lock protection when the measured time-period exceeds a predetermined first time-period; and measuring a further predetermined second time-period on an occasion of the measured time-period reaching the first time-period, and after the second time-period has elapsed, transiting at least a part of a motor drive device to the standby mode.

According to this embodiment, since the lock protection is released when the control signal has instructed stoppage of rotation of the motor for a time-period exceeding the predetermined first time-period, after the control signal has instructed stoppage of the motor, it is possible to promptly restart rotation of the motor and also to reduce power consumption.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

An embodiment relates to a cooling system which blows cool air by a fan, on an object to be cooled, such as, for example, an LSI or the like.

Figure 1:
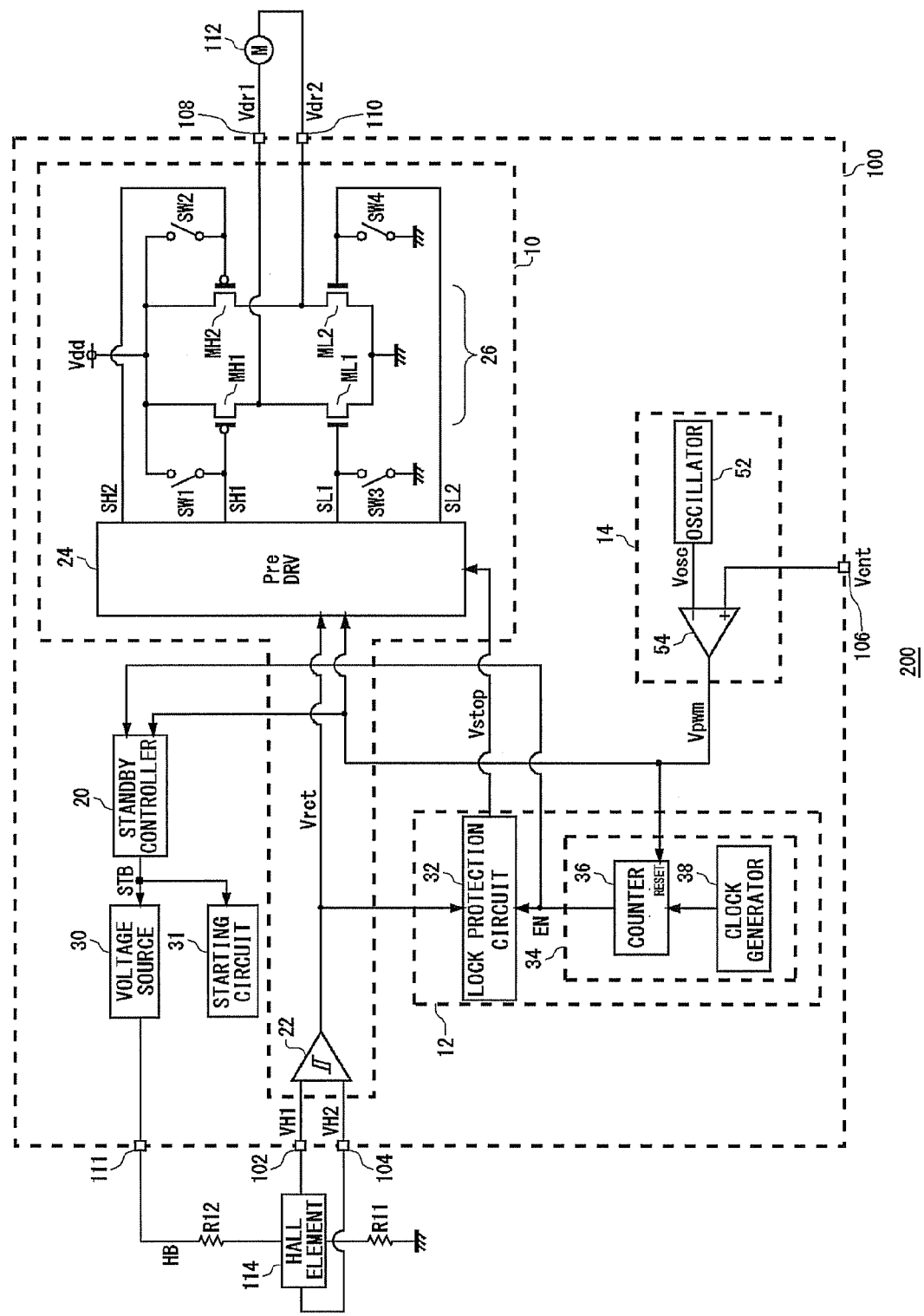
FIG. 1 is a circuit diagram showing a configuration of a cooling system according to an embodiment.

FIG. 1 shows a configuration of the cooling system 200 according to the embodiment.

The cooling system 200 is provided with a motor drive device 100, a fan motor 112, and a Hall element 114.

The fan motor 112 is a single-phase full-wave motor, and is arranged opposite the object to be cooled, which is not shown in the figure. In the fan motor 112, a coil current, that is, an energization state, is controlled by a drive voltage outputted from the motor drive device 100, and rotation is controlled.

A first terminal of the Hall element 114 is connected to a power supply line, to which a Hall bias voltage HB is applied, via a resistor R12, and a second terminal thereof is grounded via a resistor R11. Size of a signal outputted from the Hall element 114 is adjusted by the resistor R12 and the resistor R11. Therefore, either one or both of the resistor R11 and the resistor R12 may be shorted, according to an in-phase input range of a hysteresis comparator 22 described later. Furthermore, the Hall bias voltage HB is generated by the motor drive device 100.

The Hall element 114 outputs a first Hall signal VH1 and a second Hall signal VH2, whose level changes in accordance with position of a rotor of the fan motor 112. When the fan motor 112 rotates, the first Hall signal VH1 and the second Hall signal VH2 are of mutually opposite phases, and a period is a sine wave that varies according to rotational frequency of the fan motor 112.

The motor drive device 100 drives the fan motor 112, based on the first Hall signal VH1, the second Hall signal VH2, and a control signal Vcnt. The motor drive device 100 is provided with a function that, when stoppage of the fan motor 112 is instructed for a predetermined time or longer by the control signal Vcnt, to be described later, cancels (makes inactive) a lock protection function which stops energization of the fan motor 112. Furthermore, it is desirable that the motor drive device 100 is a function IC monolithically integrated on one semiconductor substrate.

The motor drive device 100 has, as terminals for input and output of signals, a first input terminal 102, a second input terminal 104, a control input terminal 106, a first output terminal 108, a second output terminal 110, and a Hall bias terminal 111.

The first Hall signal VH1 and the second Hall signal VH2 outputted by the Hall element 114 are inputted to the first input terminal 102 and the second input terminal 104.

The control signal Vcnt, instructing rotation of the fan motor 112 from outside, is inputted to the control input terminal 106.

A first drive voltage Vdr1 and a second drive voltage Vdr2, which drive the fan motor 112, are respectively outputted from the first output terminal 108 and the second output terminal 110.

The motor drive device 100 principally includes a drive unit 10, a protection circuit 12, a PWM (Pulse Width Modulation) circuit 14, a standby controller 20, a voltage source 30, and a starting circuit 31.

The PWM circuit 14 generates a PWM signal Vpwm based on the control signal Vcnt inputted from outside. The generated PWM signal Vpwm is inputted to a pre-drive circuit 24, described later. The PWM circuit 14 includes an oscillator 52 and a comparator 54.

The oscillator 52 generates, for example, a triangular waveform, a sawtooth waveform, or the like. Oscillation frequency is preferably sufficiently larger than rotational frequency of the fan motor 112. The comparator 54 compares an output voltage Vosc of the oscillator 52 and the control signal Vcnt, and outputs the PWM signal Vpwm at a high level when Vcnt>Vosc and at a low level when Vcnt<Vosc. When the rotational frequency of the fan motor 112 is raised, the control signal Vcnt is preferably enlarged and a duty ratio of the PWM signal Vpwm is preferably enlarged. When the rotational frequency of the fan motor 112 is lowered, the control signal Vcnt is preferably made smaller and the duty ratio of the PWM signal Vpwm is preferably made smaller. When the fan motor 112 is stopped, the control signal Vcnt is preferably made even smaller and on-duty of the PWM signal Vpwm is preferably got rid of.

The drive unit 10 drives the fan motor 112, based on the first Hall signal VH1, the second Hall signal VH2, and the PWM signal Vpwm described later.

The drive unit 10 includes the hysteresis comparator 22, the pre-drive circuit 24, a H-bridge 26, and switches SW1 to SW4.

The hysteresis comparator 22 compares the first Hall signal VH1, the second Hall signal VH2 outputted from the Hall element 114, and outputs a rectangular waveform signal Vrct at a high level when VH1>VH2, and at a low level when VH1<VH2.

The pre-drive circuit 24 controls ON-OFF states of each switch making up the H-bridge 26, based on the rectangular waveform signal Vrct outputted from the hysteresis comparator 22 and the PWM signal Vpwm outputted from the PWM circuit 14.

The H-bridge 26 supplies the first drive voltage Vdr1 and the second drive voltage Vdr2 to the fan motor 112 by control by the pre-drive circuit 24. The H-bridge 26 includes a first high side switch MH1, a second high side switch MH2, a first low side switch ML1, and a second low side switch ML2.

The first high side switch MH1 and the second high side switch MH2 are P-channel MOSFETs (Metal Oxide Semiconductor Field Effect Transistors), and the first low side switch ML1 and the second low side switch ML2 are N-channel MOSFETs.

The first high side switch MH1 and the first low side switch ML1 are connected in series between a power line to which a power supply voltage Vdd is applied, and ground. Voltage at a connection point of the first high side switch MH1 and the first low side switch ML1 is applied to one end of the fan motor 112 as the first drive voltage Vdr1, via the first output terminal 108.

ON-OFF states of the first high side switch MH1 and the first low side switch ML1 are controlled by gate control signals SH1 and SL1 inputted to each gate. That is, the first high side switch MH1 is ON when the gate control signal SH1 has a low level, and is OFF when the gate control signal SH1 has a high level. Furthermore, the first low side switch ML1 is ON when the gate control signal SL1 has a high level, and is OFF when the gate control signal SL1 has a low level.

The first drive voltage Vdr1 applied to the fan motor 112 is the power supply voltage Vdd when the first high side switch MH1 is ON and the first low side switch ML1 is OFF, and is ground potential 0V when the first high side switch MH1 is OFF and the first low side switch ML1 is ON.

In the same way, the second high side switch MH2 and the second low side switch ML2 are connected in series between a power line and ground. Voltage of a connection point of the second high side switch MH2 and the second low side switch ML2 is applied to the other end of the fan motor 112 as the second drive voltage Vdr2, via the second output terminal 110.

The protection circuit 12 controls ON-OFF states of each switch of the H-bridge 26 by the pre-drive circuit 24, based on the rectangular waveform signal Vrct outputted from the hysteresis comparator 22 and the PWM signal Vpwm outputted from the PWM circuit 14.

Operation of the protection circuit 12 can be divided into two cases as below.

The first is the case in which the rectangular waveform signal Vrct ceases to fluctuate in spite of the PWM signal Vpwm repeating a high level and a low level, that is, the case in which the fan motor 112 is locked by a force beyond its control, such as a foreign object being caught therein, or the like. In this case, the protection circuit 12 instructs stoppage of energization of the fan motor 112, to the pre-drive circuit 24. In this way, excess current in the motor coil is prevented.

The other is the case in which the PWM signal Vpwm indicates a low level for a predetermined time-period or longer, that is, the case in which the fan motor 112 is intentionally stopped. In this case, differently to the abovementioned case, the protection circuit 12 does not instruct stoppage of energization of the fan motor 112 even if the rectangular waveform signal Vrct does not fluctuate. In this way, a restarting operation after the fan motor 112 has been intentionally stopped is carried out smoothly.

The protection circuit 12 includes a lock protection circuit 32 and a lock controller 34. Furthermore, a TSD (Thermal Shut Down) circuit or the like may additionally be included.

The lock protection circuit 32 is active when an enable signal EN, described later, has a high level (i.e. asserted), and is inactive when the enable signal EN has a low level (i.e. negated).

When active, the lock protection circuit 32 detects that the fan motor 112 is stopped by, for example, monitoring the rectangular waveform signal Vrct outputted from the hysteresis comparator 22. When the lock protection circuit 32 detects that the fan motor 112 is locked, it switches a stop signal Vstop outputted to the pre-drive circuit 24 from a low level to a high level. When the stop signal Vstop switches to a high level, the pre-drive circuit 24 turns OFF all transistors MH1, MH2, ML1, and ML2, that make up the H-bridge 26. A time-period for turning a switch OFF is preferably from a few hundred ms to a few seconds. Turning transistors OFF may be performed by turning the switches SW1 to Sw4, described later, ON. When energization is stopped by the stop signal Vstop, a current is not supplied to the fan motor 112 even if the PWM signal Vpwm is generated.

In this way, excess current is prevented from flowing when the fan motor 112 is locked. Furthermore, a verification time-period is set from when the fan motor 112 stops until stoppage thereof is confirmed by the lock protection circuit 32. The verification time-period is, for example, approximately 0.5 seconds, and is appropriately decided according to an internal configuration of the lock protection circuit 32.

On the other hand, when inactive, the lock protection circuit 32 consistently outputs the stop signal Vstop at a low level to the pre-drive circuit 24.

When the PWM signal Vpwm generated in the PWM circuit 14 indicates a low level for a time-period exceeding a predetermined time-period, the lock controller 34 has the lock protection circuit 32 inactive. The predetermined time-period may be sufficiently longer than a period of the PWM signal Vpwm, and may be shorter than the verification time-period until locking of the fan motor 112 is confirmed in the lock protection circuit 32. The predetermined time-period is set at 60 ms in the embodiment. This 60 ms is a time set based on an off-duty time-period for an assumed lower limit frequency of the PWM signal Vpwm.

The lock controller 34 includes a counter 36 and a clock generator 38.

The clock generator 38 generates a clock of a predetermined frequency. The predetermined frequency can be appropriately decided to suit the abovementioned set predetermined time-period. The counter 36 counts the number of clocks generated in the clock generator 38, while the PWM signal Vpwm outputted from the comparator 54 indicates a low level. That is, the counter 36 starts a count, with a count value at a negative-going edge of the PWM signal Vpwm being reset, and counts the clock until the PWM signal Vpwm is reset again at a negative-going edge. In counting, when it is detected that the PWM signal Vpwm exceeds the abovementioned predetermined time-period and indicates a low level, the counter 36 switches the enable signal EN from a high level to a low level, and outputs to the lock protection circuit 32.

The lock protection circuit 32 becomes inactive when the enable signal EN switches to a low level, and the stop signal Vstop outputted to the pre-drive circuit 24 is held at a low level. At this time, from the PWM signal Vpwm continuously indicating a low level, since the pre-drive circuit 24 controls each switch that makes up the H-bridge 26 to be OFF, even if the stop signal Vstop is at a low level, the fan motor 112 is not energized.

Furthermore, the lock protection circuit 32 that was made inactive by the enable signal EN switching to a low level becomes active again thereafter, when the PWM signal Vpwm has a high level.

The standby controller 20 receives the enable signal EN. The standby controller 20 starts time measurement, when the enable signal EN transits from a high level to a low level. Here, the enable signal EN transiting from a high level to a low level means that the control signal Vcnt is continuously instructing stoppage of the fan motor 112 for a first time-period τ1 or more.

In a state in which the PWM signal Vpwm is fixed at a low level, when a predetermined second time-period τ2 elapses from starting time measurement, the motor drive device 100 is set to standby mode, operation of at least apart of the motor drive device 100 is stopped, and power saving is realized. The standby controller 20, in the standby mode, has the standby signal STB at a high level. The standby signal STB, in the standby mode and normal operation mode, is supplied to a circuit block executing different processing, and a circuit block performing shutdown in the standby mode. That is, when the PWM signal Vpwm continuously maintains a low level for a time-period of (τ1+τ2), the standby controller 20 makes the motor drive device 100 transition to the standby mode.

An explanation is given concerning standby processing.

The starting circuit 31 is a voltage source which generates a reference voltage of the motor drive device 100. The standby controller 20, in the standby mode, stops the starting circuit 31. Since a reference current generated based on this reference voltage is shut off by the reference voltage shutting down, supply of the reference current to each block inside the motor drive device 100 is stopped, and low power consumption is realized.

Furthermore, the motor drive device 100 includes a voltage source 30 which generates the Hall bias voltage HB to be supplied to the Hall element 114 via a Hall bias terminal 111. When the standby signal STB has a high level, the voltage source 30 shuts down and stops supplying voltage to the Hall element 114. In this way, power consumption by the Hall element 114, and the resistors R11 and R12 is reduced.

Furthermore, in the circuit of FIG. 1, the switches SW1 to SW4 are provided between gate and source of each transistor of the H-bridge 26. ON and OFF states of the switches SW1 to SW4 are controlled in tandem with the standby signal STB, and are ON in the standby mode. As a result, each transistor of the H-bridge 26 is in a completely OFF state, and power consumption in the standby mode is further reduced.

In the standby mode, other unnecessary circuits are shut down.

Furthermore, the standby controller 20 receives the PWM signal Vpwm. In the standby mode, at an occasion when the control signal Vcnt instructs driving of the fan motor 112, the standby controller 20 resets from the standby mode to the normal mode. For example, the standby controller 20 may perform resetting to the normal mode by monitoring an edge of the PWM signal Vpwm.

On resetting to the normal mode, the standby signal STB has a low level, and the starting circuit 31 starts, to generate the reference voltage. In this way, current is supplied to each block of the motor drive device 100 and operation is restarted.

Figure 2:
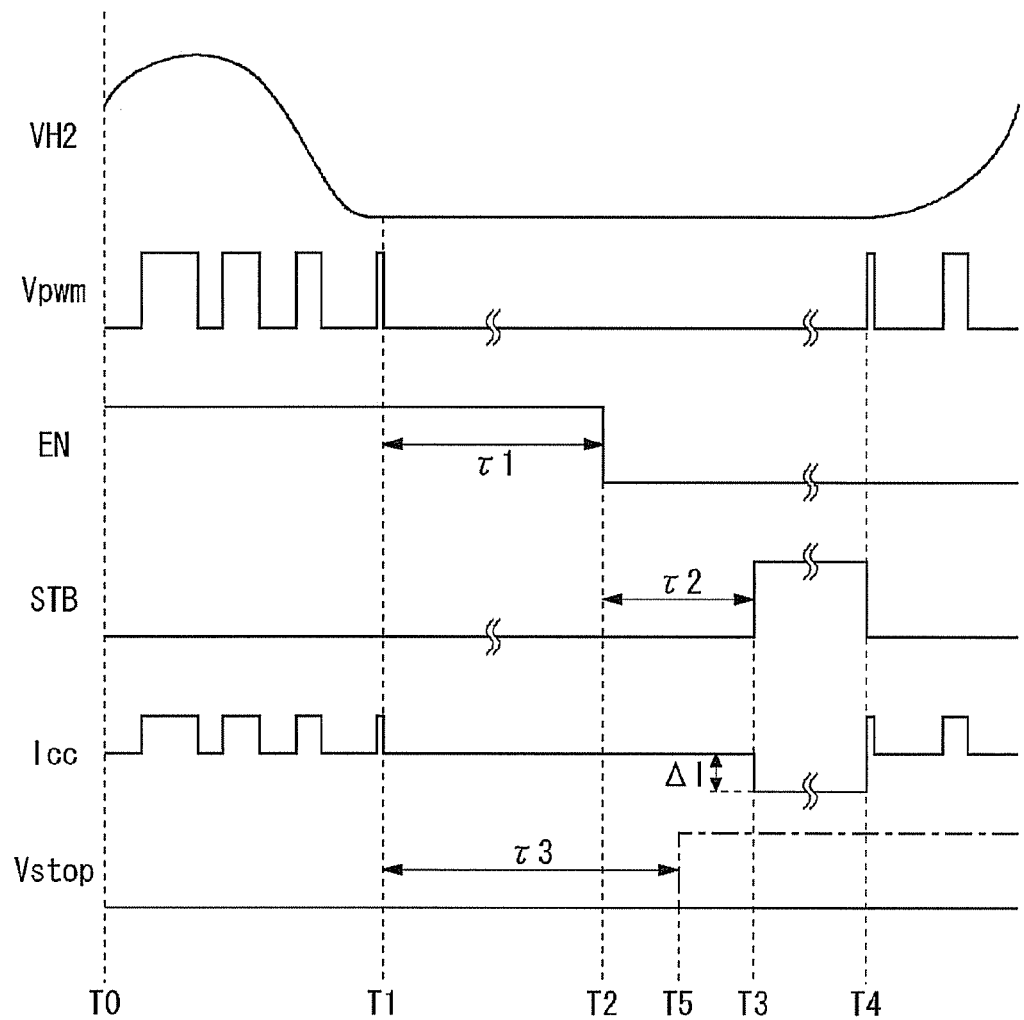
FIG. 2 is a timing chart showing a drive restarting operation of a fan motor in the cooling system of FIG. 1.

FIG. 2 is a timing chart showing a drive restarting operation of the fan motor in the cooling system 200 of FIG. 1. The timing chart of FIG. 2 shows, in order from above, the second Hall signal VH2, the PWM signal Vpwm, the enable signal EN, the standby signal STB, consumed current Icc of the circuit, and the stop signal Vstop. Moreover, the same figure shows a vertical axis and a horizontal axis enlarged and contracted, as appropriate.

From time T0 to time T1, the PWM circuit 14 outputs the PWM signal Vpwm with a duty ratio corresponding to the size of the control signal Vcnt. During this time, the fan motor 112 rotates at a speed corresponding to the duty ratio of the PWM signal Vpwm, and the second Hall signal VH2 shows a sine wave of a frequency corresponding to the rotational frequency of the fan motor 112. Furthermore, in this time, since the PWM signal Vpwm repeats a high level and a low level in a short time, the enable signal EN indicates a high level. Therefore, the lock protection circuit 32 is active. Furthermore, since the fan motor 112 is not stopped, the stop signal Vstop outputted from the lock protection circuit 32 to the pre-drive circuit 24 has a low level. Therefore, the pre-drive circuit 24 supplies the first drive voltage Vdr1 and the second drive voltage Vdr2 to the fan motor 112 by controlling ON-OFF states of each switch of the H-bridge 26.

At time T1, when the control signal Vcnt is decreased in order to stop driving of the fan motor 112, the duty ratio of the PWM signal Vpwm is 0. After time T1, the PWM signal Vpwm has a low level until the control signal Vcnt is raised in order to restart driving of the fan motor 112 at time T4.

The counter 36 counts the number of clocks generated in the clock generator 38, from time T1 at which the duty ratio of the PWM signal Vpwm is 0, and at time T2 at which the predetermined first time-period τ1 (=60 ms) has elapsed, the enable signal EN is switched from a high level to a low level. In this way, the lock protection circuit 32 is inactive.

In order to clarify a first effect of this embodiment, an explanation will be given of operation in cases of performing switching of the lock protection circuit 32 between being active and inactive by the enable signal EN.

In such cases, rotation of the fan motor 112 is stopped by the duty ratio of the PWM signal being 0, and the Hall signal VH2 is fixed at time T1. If the Hall signal VH2 or the rectangular waveform signal Vrct continuously maintains a fixed value during a predetermined verification time-period τ3 (for example, 0.5 s), the lock protection circuit 32 judges that the fan motor 112 is locked. In other words, the verification time-period τ3 is the time required for the lock protection circuit 32 to confirm that the fan motor 112 is stopped. If the lock protection circuit 32 is active, at time T5 after the verification time-period τ3 has elapsed from time T1, the stop signal Vstop outputted to the pre-drive circuit 24 is switched to a high level. The waveform at this time is shown by an alternate long and short dash line. When the stop signal Vstop has a high level, energization of the fan motor 112 is stopped for a few seconds. Thus, at time T4, the level of the control signal Vcnt rises, and when rotation of the fan motor 112 is instructed, since the circuit is in a completely stopped state, starting of rotation of the fan motor 112 is delayed. For example, if rotation of the fan motor 112 is instructed by the control signal Vcnt immediately after the stop signal Vstop has a high level, since there is no energization for a few seconds thereafter, rotation of the fan motor 112 is delayed.

In response to this, in the present embodiment, the lock protection circuit 32 is switched between being active and inactive by the enable signal EN. That is, at time T1 the PWM signal Vpwm is set to a low level, and at time T2 when the first time-period τ1 has elapsed thereafter, the enable signal EN is set to a low level. As a result, the lock protection circuit 32 is in an inactive state. When the lock protection circuit 32 is in an inactive state, at time T5 also, at which the Hall signal VH2 has maintained a constant value for the verification time-period τ3, the stop signal Vstop, outputted to the pre-drive circuit 24, does not switch to a high level and maintains a low level.

At time T4, the control signal Vcnt is raised to drive the fan motor 112 once again. Thereupon, the PWM circuit 14 restarts output of the PWM signal Vpwm with a duty ratio corresponding to the size of the control signal Vcnt. At this time, since the lock protection circuit 32 is made inactive by the enable signal EN that is at a low level as described above, the lock controller 34 maintains the stop signal Vstop at a low level. Therefore, when the control signal Vcnt is raised at time T4, driving of the fan motor 112 is promptly restarted, and the second Hall signal VH2 indicates a sine wave.

At described above, according to the cooling system 200 of the present embodiment, when the PWM signal Vpwm generated by the PWM circuit 14 indicates a low level for a time-period exceeding a predetermined time-period, since the lock controller 34 has the lock protection circuit 32 inactive, it is possible to distinguish between a stoppage of the motor due to the PWM signal Vpwm and locking of the motor due to a force beyond its control. Therefore, after rotation of the fan motor 112 is stopped by the PWM signal Vpwm, the motor drive device 100 promptly restarts rotation thereof, and a quick cooling effect can be obtained for cases such as, for example, when it is necessary to rapidly cool a device while the fan motor 112 is stopped.

Cases in which a function of the lock controller 34 is not provided differ from cases in which the function of the above-mentioned lock controller 34 is provided. That is, when the function of the lock controller 34 is provided, the stop signal Vstop is maintained at a low level also at time T5, but when this function is not provided, the stop signal Vstop is switched to a high level at time T5. Therefore, when the function of the lock controller 34 is not provided, even if the control signal Vcnt for restarting driving of the fan motor 112 at time T4 is raised, and input of the PWM signal Vpwm with a corresponding duty ratio is received, the pre-drive circuit 24 continues to have each switch of the H-bridge 26 OFF. As a result, the fan motor 112 is not energized, and driving cannot be promptly restarted. Thus, the temperature of a device to be cooled cannot be appropriately managed.

According to the cooling system 200 according to the present embodiment, this type of problem can be preferably solved.

Next, a second effect of the embodiment is explained. When the enable signal EN is switched to a low level at time T2, the standby controller 20 starts time measurement in a time-period in which the PWM signal Vpwm has a low level. When the time-period in which the PWM signal Vpwm has a low level is maintained for the second time-period τ2, the standby signal STB is switched to a high level, and operation of each block of the motor drive device 100 is stopped. As a result, the circuit current Icc of the motor drive device 100 decreases to the vicinity of 0 mA, and low power consumption is realized.

After that, at time T4 when the PWM signal Vpwm goes to a high level, the standby controller 20 switches the standby signal STB to a low level, and resets each block of the motor drive device 100 to a drive state. If the PWM signal Vpwm has a high level before the second time-period has τ2 elapsed, there is no transition to the standby mode, and rotation of the fan motor 112 is restarted.

Moreover, according to setting of the counter 36, τ2≧0 is also feasible.

In this way, according to the motor drive device 100 according to the present embodiment, when a state in which rotation of the fan motor 112 is not instructed is maintained for a predetermined time-period (τ1+τ2), by switching to the standby mode, it is possible to reduce current consumed in the circuit compared to conventional cases. In addition, since a transition to the standby mode of time T3 to T4 is executed based on the enable signal EN, when transitioning to the standby mode, the function of the lock protection circuit 32 is guaranteed to be disabled. Therefore, when restarting of rotation of the fan motor 112 is instructed thereafter at time T4, it is possible to promptly reset from the standby mode to the normal mode and make the fan motor 112 rotate.

The abovementioned embodiment is an example, and a person skilled in the art will understand that various modifications in combinations of various component elements and various processes thereof are possible, and that such modified examples are within the scope of the present invention.

In the embodiment, the drive unit 10 is formed of the hysteresis comparator 22, the pre-drive circuit 24, and the H-bridge 26, but the present invention is not limited thereto.

Figure 3:
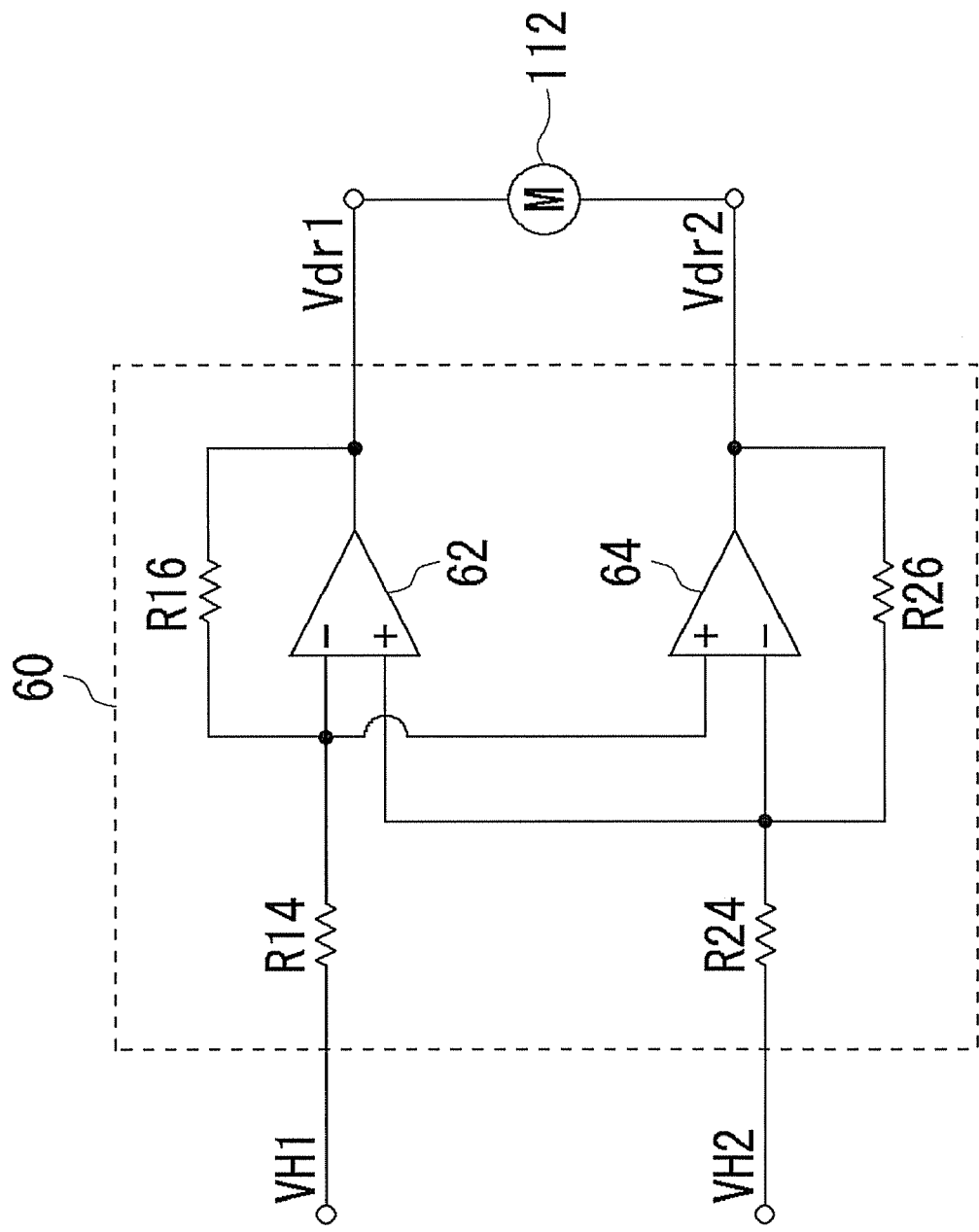
FIG. 3 is a circuit diagram showing a configuration of a drive unit according to a modified example.

FIG. 3 shows a configuration of a drive unit 60 according to a modified example. The drive unit 60 includes a first operational amplifier 62 and a second operational amplifier 64.

A first drive voltage Vdr1 outputted by the first operational amplifier 62 is fed back to an inverting input terminal of the first operational amplifier 62 and a non-inverting input terminal of the second operational amplifier 64 by a resistor R16. A second drive voltage Vdr2 outputted by the second operational amplifier 64 is fed back to a non-inverting input terminal of the first operational amplifier 62 and an inverting input terminal of the second operational amplifier 64 by a resistor R26.

The first operational amplifier 62 and the second operational amplifier 64 are configured such that, at output stages, two transistors are arranged, connected in series between a power supply and ground, and an output voltage is taken from a connection point thereof. The two transistors respectively arranged at output stages of the first operational amplifier 62 and the second operational amplifier 64 correspond to the various switches in the H-bridge 26 of FIG. 1. The first drive voltage Vrd1 and the second drive voltage Vdr2 have a value that is the difference between the first Hall signal VH1 and the second Hall signal VH2, which is amplified. Furthermore, when the lock protection circuit 32 of FIG. 1 detects locking of the fan motor 112, and switches the stop signal Vstop from a low level to a high level, the first operational amplifier 62 and the second operational amplifier 64 are OFF and energization of the fan motor 112 is stopped.

In the embodiment an explanation has been given concerning cases in which the PWM signal Vpwm is generated based on the control signal Vcnt, but the PWM signal Vpwm may be inputted directly from outside.

Furthermore, in the embodiment an explanation has been given of cases in which the motor drive device 100 performs PWM-driving of the fan motor 112, but the present invention is not limited thereto. The motor drive device 100 may also perform linear driving of the fan motor 112.

Furthermore, in the embodiment an explanation has been given of cases in which the fan motor 112 is a single-phase motor, but the present invention is not limited thereto. The fan motor 112 may be a multi-phase motor.

Furthermore, in the embodiment, rotation of the fan motor 112 is detected by a Hall element 114, but the present invention is not limited thereto. Rotation of the fan motor 112 may be detected by monitoring induced voltage generated in a coil of the fan motor 112.

Furthermore, in the embodiment the lock controller 34 monitors time in which the PWM signal Vpwm indicates a low level, by the counter 36 counting clocks generated by the clock generator 38, but the present invention is not limited thereto. The time in which the PWM signal Vpwm indicates a low level may be monitored by a time constant circuit that uses a capacitor and a resistor to give a delay to the PWM signal Vpwm.

In the embodiment the lock protection circuit 32 monitors the rectangular waveform signal Vrct, but the present invention is not limited thereto. The lock protection circuit 32 may monitor the first Hall signal VH1 or the second Hall signal VH2, and may monitor induced voltage generated in the coil of the fan motor 112.

In the embodiment, an explanation has been given of cases in which the motor drive device 100 is monolithically integrated on one LSI, but the present invention is not limited thereto, and some of the component elements may be arranged as discrete elements outside of the LSI or as chip parts, or may be configured as a plurality of LSIs. For example, the H-bridge 26 may be configured using a discrete power transistor. Furthermore, the clock generator 38 may be arranged externally, and the counter 36 may count the clocks inputted from outside.

While the preferred embodiments of the present invention have been described using specific terms, such description is for illustrative purposes only, and it is to be understood that changes and variations may be made without departing from the spirit or scope of the appended claims.

What is claimed is:

1. A motor drive device comprising:
   a drive unit which controls energization of a motor that is to be driven, based on a control signal instructing rotation of the motor the control signal being variable between a state to instruct stoppage of the motor and a state to instruct driving of the motor;
   a lock protection circuit which monitors a signal indicating a present rotational condition of the motor and stops energization of the motor, when rotation of the motor is stopped;
   a lock controller which has the lock protection circuit inactive, in cases in which the control signal continues to instruct stoppage of the motor for at least a predetermined first time-period the predetermined first time-period being measured from a time at which the control signal transitions from the state to instruct driving of the motor to the state to instruct stoppage of the motor; and
   a standby controller which starts time measurement at an occasion when the control signal has continued to instruct stoppage of the motor for at least the first time-period, and after a further predetermined second time-period has elapsed, stops at least part of the motor drive device, and makes the motor drive device transit to a standby mode.

2. A motor drive device comprising:
   a drive unit which controls energization of a motor that is to be driven, based on a control signal instructing rotation of the motor the control signal being variable between a state to instruct stoppage of the motor and a state to instruct driving of the motor;
   a lock protection circuit which monitors a signal indicating a present rotational condition of the motor and stops energization of the motor, when rotation of the motor is stopped; and
   a lock controller which has the lock protection circuit inactive, in cases in which the control signal continues to instruct stoppage of the motor for at least a predetermined first time-period the predetermined first time-period being measured from a time at which the control signal transitions from the state to instruct driving of the motor to the state to instruct stoppage of the motor, wherein
   the motor drive device starts time measurement at an occasion when the control signal has continued to instruct stoppage of the motor for at least the first time-period, and after a further predetermined second time-period has elapsed, the motor drive device makes transition to a standby mode.

3. A motor drive device according to claim 1, wherein
   the standby controller, in the standby mode, stops a voltage source generating a reference voltage for the motor drive device.

4. A motor drive device according to claim 1, wherein
   the signal indicating a present rotational condition of the motor is based on a signal from a Hall element for detecting rotation of the motor.

5. A motor drive device according to claim 4, wherein
   the standby controller, in the standby mode, stops supplying of voltage to the Hall element.

6. A motor drive device according to claim 1, wherein
   the signal indicating a present rotational condition of the motor is based on a signal from a back electromotive force induced at a coil of the motor.

7. A motor drive device according to claim 1, wherein
   the standby controller, in the standby mode, fixes electrical potential of a control terminal of a transistor of an output stage connected to a coil of the motor, to turn the transistor full OFF.

8. A motor drive device according to claim 1, wherein
   the standby controller, at an occasion when the control signal instructs driving of the motor, resets from the standby mode to normal mode.

9. A motor drive device according to claim 1, wherein the motor drive device is monolithically integrated on one semiconductor substrate.

10. A cooling system comprising:
    a fan motor; and
    a motor drive device which drives, as the motor to be driven, the fan motor, the motor drive device comprising:
    a drive unit which controls energization of a motor that is to be driven, based on a control signal instructing rotation of the motor the control signal being variable between a state to instruct stoppage of the motor and a state to instruct driving of the motor;

a lock protection circuit which monitors a signal indicating a present rotational condition of the motor and stops energization of the motor, when rotation of the motor is stopped;

a lock controller which has the lock protection circuit inactive, in cases in which the control signal continues to instruct stoppage of the motor for at least a predetermined first time-period the predetermined first time-period being measured from a time at which the control signal transitions from the state to instruct driving of the motor to the state to instruct stoppage of the motor; and a standby controller which starts time measurement at an occasion when the control signal has continued to instruct stoppage of the motor for at least the first time-period, and after a further predetermined second time-period has elapsed, stops at least part of the motor drive device, and makes the motor drive device transit to a standby mode.

11. A lock protection method of stopping energization of a motor to be driven, when rotation of the motor is stopped, comprising:

monitoring a signal indicating a present rotational condition of the motor and making a transition to a lock protection state at which energization of the motor is stopped, when the signal indicates stoppage of the motor the control signal being variable between a state to instruct stoppage of the motor and a state to instruct driving of the motor;

monitoring a control signal which instructs rotation of the motor, and measuring a time-period in which the control signal continues to instruct stoppage of the motor;

releasing the lock protection state when the measured time-period exceeds a predetermined first time-period the predetermined first time-period being measured from a time at which the control signal transitions from the state to instruct driving of the motor to the state to instruct stoppage of the motor; and measuring a further predetermined second time-period on an occasion when the measured time-period reaches the first time-period, and after the second time-period has elapsed, transiting at least a part of a motor drive device to a standby mode.

12. A lock protection method of stopping energization of a motor to be driven, when rotation of the motor is stopped, comprising:

monitoring a signal indicating a present rotational condition of the motor, and making a transition to a lock protection state at which energization of the motor is stopped, when the signal indicates stoppage of the motor the control signal being variable between a state to instruct stoppage of the motor and a state to instruct driving of the motor;

monitoring a control signal which instructs rotation of the motor, and measuring a time-period in which the control signal continues to instruct stoppage of the motor;

releasing the lock protection state when the measured time-period exceeds a predetermined first time-period the predetermined first time-period being measured from a time at which the control signal transitions from the state to instruct driving of the motor to the state to instruct stoppage of the motor; and measuring a further predetermined second time-period on an occasion when the measured time-period reaches the first time-period, and after the second time period has elapsed, stopping at least a part of a motor drive device.

13. A motor drive device comprising:

a drive unit which controls energization of a motor that is to be driven, based on a control signal instructing rotation of the motor the control signal being variable between a state to instruct stoppage of the motor and a state to instruct driving of the motor;

a lock protection circuit which monitors a signal indicating a present rotational condition of the motor and stops energization of the motor, when rotation of the motor is stopped; and a lock controller which has the lock protection circuit inactive, in cases in which the control signal continues to instruct stoppage of the motor for at least a predetermined first time-period the predetermined first time-period being measured from a time at which the control signal transitions from the state to instruct driving of the motor to the state to instruct stoppage of the motor, wherein the motor drive device starts time measurement at an occasion when the control signal has continued to instruct stoppage of the motor for at least the first time-period, and after a further predetermined second time-period has elapsed, the motor drive device stops at least part of the motor drive device.

14. A motor drive device according to claim 13, wherein the signal indicating a present rotational condition of the motor is based on a signal from a Hall element for detecting rotation of the motor.

15. A motor drive device according to claim 14, wherein a standby controller, in the standby mode, stops supplying of voltage to the Hall element.

16. A motor drive device according to claim 13, wherein the signal indicating a present rotational condition of the motor is based on a signal from a back electromotive force induced at a coil of the motor.

17. A motor drive device according to claim 2, wherein a standby controller, in the standby mode, stops a voltage source generating a reference voltage for the motor drive device.

18. A motor drive device according to claim 2, wherein the signal indicating a present rotational condition of the motor is based on a signal from a Hall element for detecting rotation of the motor.

19. A motor drive device according to claim 18, wherein a standby controller, in the standby mode, stops supplying of voltage to the Hall element.

20. A motor drive device according to claim 2, wherein the signal indicating a present rotational condition of the motor is based on a signal from a back electromotive force induced at a coil of the motor.

21. A motor drive device according to claim 13, wherein a standby controller, in the standby mode, stops a voltage source generating a reference voltage for the motor drive device.

* * * * *